United States Patent [19]

Wilcox et al.

[11] Patent Number: 5,033,199
[45] Date of Patent: Jul. 23, 1991

[54] LEVEL VIAL HOLDER ASSEMBLY

[75] Inventors: John H. Wilcox; Steven R. Dakolios, Shaftsbury; Gregory J. Gartner, Sunderland, all of Vt.; Martin M. Brown, Kensington; Joseph J. Guarnaccia, Wethersfield, both of Conn.

[73] Assignee: The Stanley Works, New Britain, Conn.

[21] Appl. No.: 419,689

[22] Filed: Oct. 11, 1989

[51] Int. Cl.$^5$ .................................................. G01C 9/28
[52] U.S. Cl. ........................................ 33/379; 33/381; D10/69
[58] Field of Search ................. 33/290, 291, 292, 379, 33/451, 380–384, 385, 386, 387, 388, 389, 390; D10/69

[56] References Cited

U.S. PATENT DOCUMENTS

| | | | |
|---|---|---|---|
| 1,213,020 | 1/1917 | Roeske | 33/381 |
| 2,432,124 | 12/1947 | Raines et al. | 33/390 |
| 3,029,524 | 4/1962 | Vaida et al. | 33/381 |
| 3,311,990 | 4/1967 | Wright | 33/381 |
| 3,442,024 | 5/1969 | Don | 33/381 |
| 3,738,015 | 6/1973 | De Jong | 33/379 |
| 3,835,549 | 9/1974 | De Jong et al. | 33/379 |
| 3,878,618 | 4/1975 | Freeman | 33/379 |
| 4,559,714 | 12/1985 | Wright | 33/379 |

FOREIGN PATENT DOCUMENTS 1136293 5/1957 France ................................. 33/379

Primary Examiner—Thomas B. Will
Attorney, Agent, or Firm—Chilton, Alix & Van Kirk

[57] ABSTRACT

A level of the type having parallel working surfaces and an interconnecting web is provided with an aperture having at least a pair of oppositely directed notches prearranged and configured relative to each other so that ends of a level vial accurately fit within the notches. The vial is provided at one end with a vial retaining tongue that extends from one end thereof and abuts one side of the web to laterally position and orient the vial within the plane of the web. The assembly includes a vial retainer cover that overlies the aperture and includes a vial engaging abutment that bears against the tongue of the vial to hold that member in retentive butting engagement against the side of the web and prevent lateral displacement or misorientation of the vial. The elongated vial may have a gradually tapered surface that not only permits rapid molding of the vial but also facilitates the use of a curved vial configuration with the proper degree of curvature accurately molded therein.

21 Claims, 2 Drawing Sheets

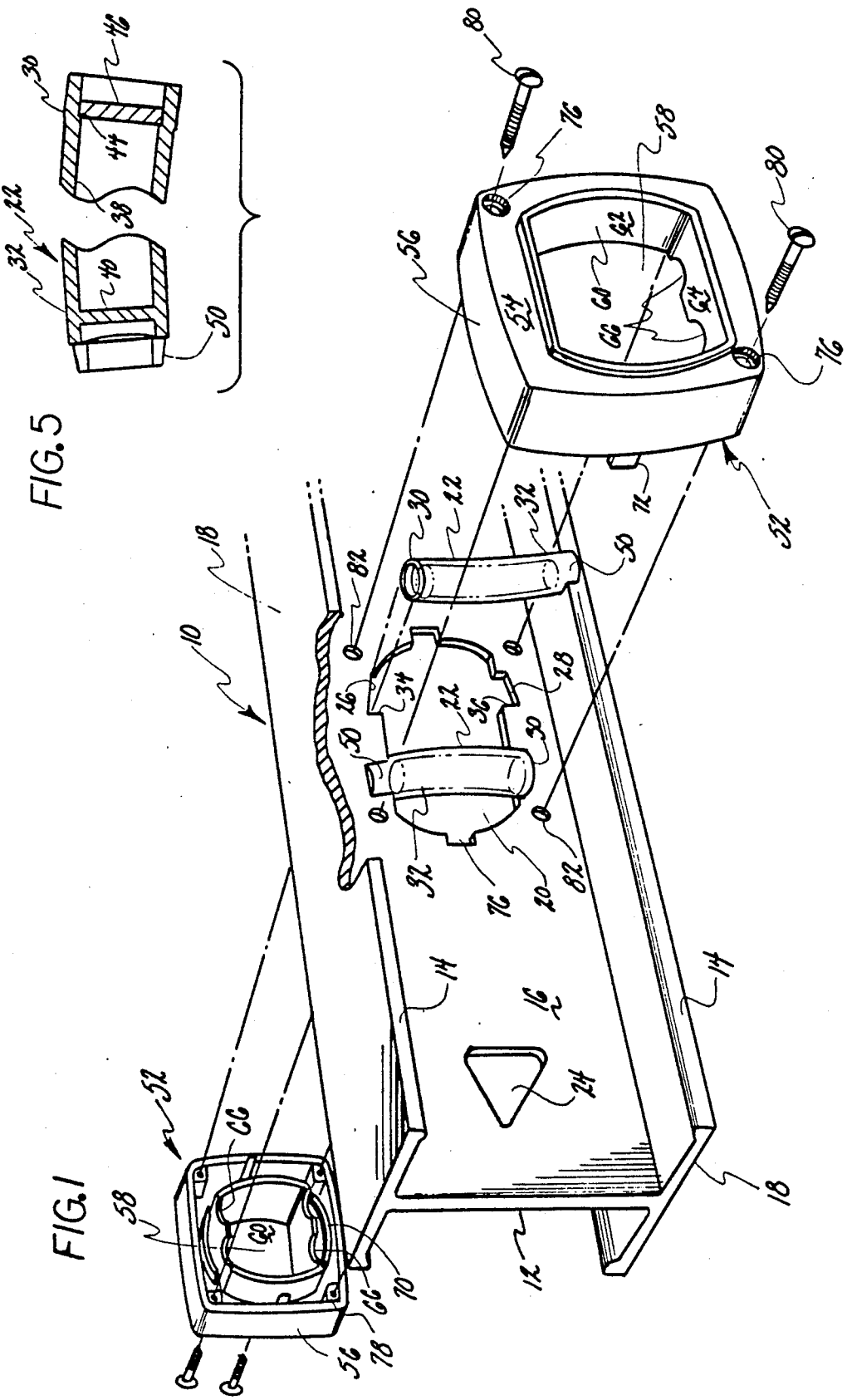

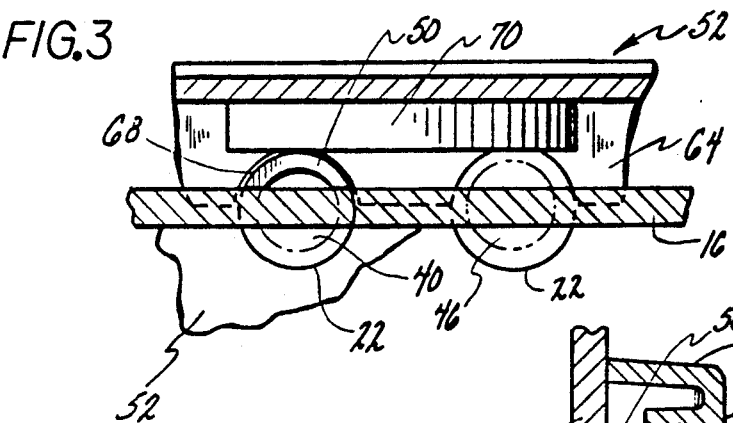
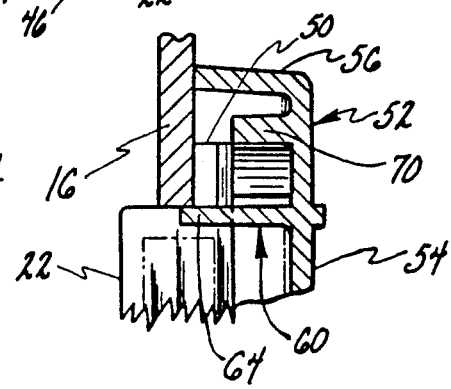
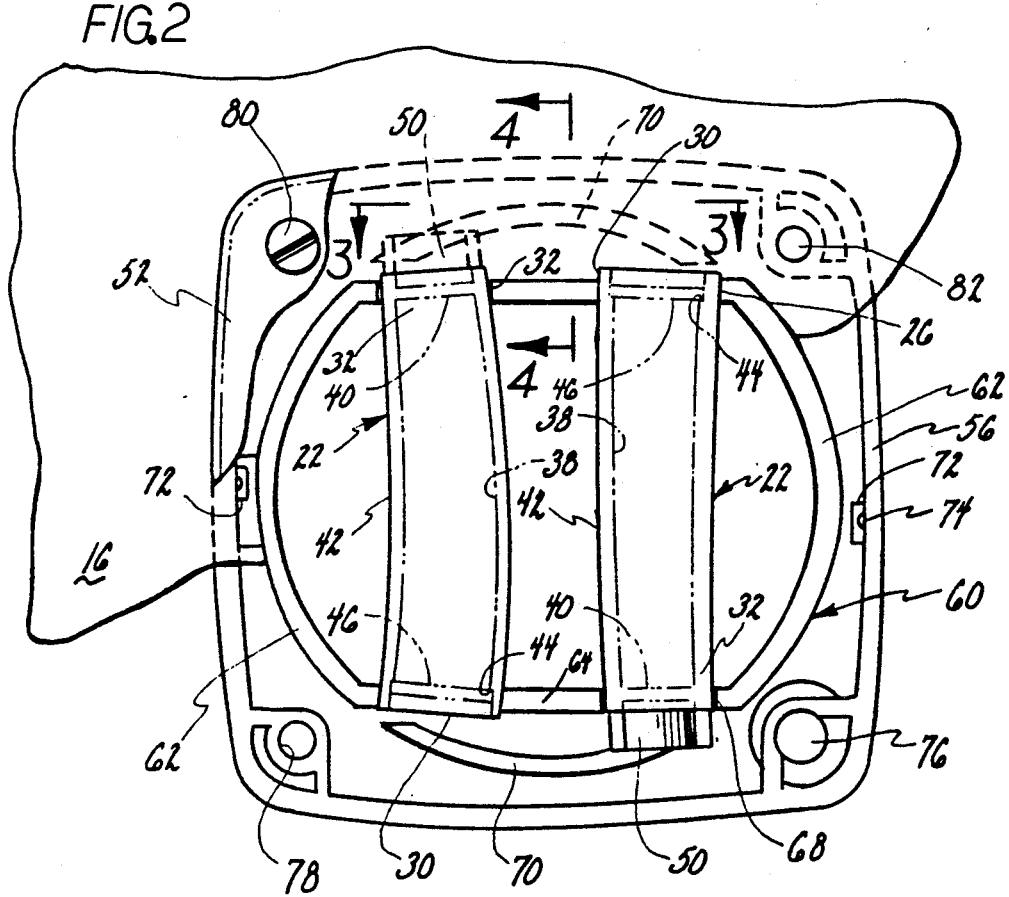

LEVEL VIAL HOLDER ASSEMBLY

BACKGROUND AND SUMMARY OF THE INVENTION

The present invention relates generally to levels used by carpenters, masons and the like and is more particularly concerned with a new and improved vial holder assembly for mounting the vials on the levels.

As described in the DeJong U.S. Pat. No. 3,738,015, vial retainer assemblies employed heretofore have utilized opposed pairs of notches within the level frame to position the level vial relative to the working surfaces coupled with retainer caps or covers that served to capture the vials and retain them in position on the frame of the level. The present invention utilizes a similar type of system but is designed to provide greater flexibility with respect to the type of vial employed without sacrificing accuracy of mounting or ease of assembly. The mounting assembly advantageously can be employed with curved vials to not only properly locate the vials but also prevent undesirable rotation thereof without the need for adjustment or the use of adhesives. In this connection, it is a feature of the present invention that the retaining cap or cover may employ uniform vial retaining recesses, even with vials of different dimensions, and may be used on one or both sides of the level frame with equal effectiveness.

It is another feature of the present invention that the vial assembly readily lends itself to automatic assembly with complete accuracy in a facile manner thus providing high quality at minimum cost.

It is a further feature of the present invention that the vial employed in the retaining system may be tapered from one end to the other while the retaining cover provides a universal configuration having multiple applications. The vial's tapered structure and the cover's uniform configuration can be produced in a highly economical and rapid manner. Included in this object is the provision for a level vial that is easily and accurately assembled in the level frame and retained therein through the cooperative interengagement amongst the cover, the level frame, and the level vial itself.

Other features and advantages will be in part obvious and in part pointed out more in detail hereinafter.

These and related features are achieved in accordance with the present invention by providing a level comprising a frame having parallel working surfaces and a web interconnecting those surfaces. The web is provided with an aperture having at least a pair of oppositely directed notches prearranged and configured relative to each other so that the ends of the vial accurately fit within the notches, properly positioning the vial within the plane of the web relative to the working surfaces. The vial is provided at one end with a vial retaining tongue that abuts one side of the web to laterally position and orient the vial within the plane of the web. The assembly includes a vial retainer cover that overlies the aperture and includes a vial engaging abutment that bears against the tongue of the vial to hold that member in retentive butting engagement against the side of the web and prevent lateral displacement or misorientation of the vial.

In a preferred embodiment the present invention further includes an elongated vial having a gradually tapered surface that not only permits rapid molding of the vial, but also facilitates the use of a curved vial configuration with the proper degree of curvature accurately molded therein.

A better understanding of the invention will be obtained from the following detailed description and accompanying drawing of an illustrative application of the invention.

BRIEF DESCRIPTION OF THE DRAWINGS

In the drawings;

FIG. 1 is a partial, exploded, perspective view of a level embodying the present invention;

FIG. 2 is an enlarged front elevational view, partially broken away, of the level vial assembly of the present invention.

FIG. 3 is a sectional view taken along the line 3—3 of FIG. 2,

FIG. 4 is a sectional view taken along the line 4—4 of FIG. 2, and

FIG. 5 is a fragmentary longitudinal sectional view of the curved level vial.

DESCRIPTION oF A PREFERRED EMBODIMENT

Referring now to the drawing in greater detail wherein like reference numerals indicate like parts throughout the several figures, the level 10 is shown as including a level frame member 12 having an I-beam configuration and comprising a pair of parallel flanges 14 interconnected by a central web portion 16. While the frame may be formed of any suitable material, it is generally preferred to employ an extruded aluminum frame or other light weight metal such as magnesium or the like for warp free operation. The spaced parallel flanges 14 carry the planar working surfaces 18 of the level while the interconnecting web 16 is preferably provided with a plurality (only one is illustrated) of longitudinally spaced, generally elliptical apertures 20, each of which are designed to accommodate two level vials 22. Additional apertures may be included for easily gripping the level or for suspending it in a vertical or storage position, such as by one corner of the triangular aperture 24.

The elliptical apertures 20 are each provided with two pairs of diametrically opposed side notches 26, 28 that are configured and dimensioned to receive the ends of the vial at a preselected angle relative to the parallel working surfaces 18. In the particular embodiment illustrated in FIG. 1, the elliptical aperture 20 extends longitudinally of the web 16 and the vials 22 are disposed perpendicular to the working surfaces 18. As can be appreciated other apertures can be arranged so that the vials are essentially parallel to the working surfaces. Additionally, other desired angular relationships may be selected between the orientation of the vials and the working surfaces of the level.

As best seen in FIGS. 1 and 2, the vials 22 are of the curved or bent type and each vial has a gradually tapered exterior surface such that one end 30 has a somewhat larger circumference than the opposite end 32 thereof. It is a feature of the present invention that the notches 26, 28 in the web also are formed so as to conform to the diametric end dimensions of the vials 22 and are disposed at an angular orientation relative to the longitudinal center line of the aperture 20 so as to accommodate the arcuate contour of the bent vials. In the particular embodiment illustrated, the larger notches 26 are staggered, that is, they are located on opposite sides of each aperture 20 although, as will be appreciated, the large notches could be formed on the same side without departing from the present invention. Since the notches are sized to accommodate vials of specific diametric end dimension and configuration, the sides 34, 36 of notches 26, 28, respectively, abutting the convex surfaces of the vials 22 also are precisely and accurately aligned relative to the working surfaces 18 of the frame so that when the vials 22 are assembled on the frame and positioned within the plane of the web 16, they are accurately positioned relative to the working surfaces 18.

As mentioned hereinbefore, each vial 22 is gradually tapered from one end to the other. The taper is on both the interior and exterior surfaces of the vial and, in the preferred embodiment, the vial is further provided with an arcuate or curved configuration so as to provide a controlled convex interior surface 38 along which the bubble moves during the manipulative use of the level. This tapered configuration lends itself to a rapid and accurate molding operation with quick release of the transparent plastic vial from the mold. In this connection it should be noted that plastic is preferred over glass both for ease of control over the dimensions of the vial and resistance to breakage. In the embodiment illustrated, the thickness of the vial wall is substantially uniform along the length of the vial so that the accurate positioning of the vial in the aperture of the web is readily achieved. As will be appreciated, where only the interior surface of the vial is tapered and the exterior surface is not, resulting in a differential thickness between one end of the vial and the opposite end, then the notches for receiving the vial must be adjusted so as to properly orient the interior convex surface of the vial relative to the working surfaces of the level frame. Thus, as can be appreciated, by properly coordinating the dimensions and locations of the notches relative to the size and contour of the vial, it is possible to accurately position the vial and also maintain the vial in its appropriate position relative to the working surfaces of the level.

As best seen in FIG. 2 and 3, the vials are circular in cross section and of uniform wall thickness. The vials are molded with precision and accuracy to provide both a bent and tapered configuration. This permits excellent control over both the size of the vial and the accuracy of curvature of the interior convex surface 38. The vial 22 is molded with a recessed base end wall 40 integrally formed at the narrow end of the tapered longitudinally extending body portion 42 and with a recessed shoulder 44 at the open wide end 30 of the body 42. A disc shaped closure 46 fits within the open end 30 and rests on the interior shoulder 44 to enclose the liquid therein as well as the air space of controlled size forming the bubble within the vial.

It is a feature of the present invention that the web 16 of the level frame serves primarily to position the vials within the plane of the web relative to the working surfaces 18 but does not prevent lateral movement of the vial away from the web. To prevent such movement the vial 22 is provided with an integral end extension or tongue 50 that projects beyond the vial and abuts against one side of the web 16. Where the vial has a uniform external dimension along its length, the tongue can be positioned on either end of the vial. However, where the exterior surface of the vial tapers, as shown in FIG. 1, the tongue 50 is located on the narrower end 32 of the vial for reasons that will be more fully understood and explained in connection with the structure of the retaining cover. In the preferred embodiment illustrated, the tongue 50 is accurate and conforms to the tubular wall configuration of the vial's main body portion 42, thus forming an integral extension of the narrow end 32 of the vial 22. The extension is semicircular in cross sectional configuration, as shown in FIG. 3, but terminates short of the plane extending through the longitudinal center line of the vial in order to accommodate one half of the thickness of the web 16. As will be appreciated, the extension 50 abuts against a side wall of the web 16 and prevents the vial at the narrow end from being laterally displaced in one lateral direction only. It further acts to properly rotationally orient the vial relative to the working surfaces 18.

According to a further feature of the present invention there is provided a retaining cap or cover 52 that is of symmetrical construction so that it can be used interchangeably on either side of the web for retaining the vial firmly in place and preventing transverse or lateral movement thereof. As best seen in FIGS. 1 and 2, the retainer cover 52 is a generally square member of essentially U-shaped cross section having a front face 54 spaced from the web by a peripheral wall 56 constructed to bear against the side wall of the web 16 outwardly from the perimeter of the aperture 20. The face 54 of the cover is provided with a central window 58 defined by a frame or skirt 60 that projects from the face 54 inwardly of the peripheral wall 56. The skirt 60 conforms to the size and general shape of the aperture 20 and extends beyond wall 56 to as to enter into the aperture 20, the amount of excess projection being slightly less than one half the thickness of the web. The end walls 62 of the elliptical skirt 60 are arcuately contoured while the side walls 64 of the skirt are substantially flat, having only a slight bow therein. Each side wall 64 of the skirt 60 is provided with a pair of spaced semicircular recesses 66 of identical size and shape for receiving the vial and engaging the larger end 30 thereof, thereby holding the vials in alignment within the web when the cover 52 is mounted on the frame. Since the semicircular recesses 66 are of equal size, the recesses positioned at the narrow end 32 of the vial, will not engage the vial but will define a gap 68 between the recess and the narrow end 32 of the vial.

A pair of arcuate secondary or intermediate skirts 70 are provided between the peripheral wall 56 and the side walls 64 of the skirt 60. The secondary skirts 70 project inwardly from the face 54 a distance about one half that of skirt 60, terminating slightly beyond the deepest extent of recesses 66, as best seen in FIG. 3. The secondary skirts 70 project beyond the bottom of recesses 66 by a sufficient distance to accommodate the difference in radial dimension between the large end 30 of the vial and the tongue 50 on the narrow end 32 of the vial. The secondary skirts 70 contact and bear against the tongues 50, firmly holding them in abutting engagement with the web 16 of the frame and preventing lateral and rotational movement of the narrow end 32 of the vial. Since the secondary skirts 70 are located on opposite sides of the skirt 60, they will engage the vial tongues 50 regardless of the position of the vial as mounted on the web. As shown, the secondary skirts 70 extend in an arcuate fashion, having the same radius as the end walls 62 of the skirt 60. However, other configurations that will permit the secondary skirts to perform their holding function relative to the tongues may be employed.

Each retainer cover 52 is also provided with a pair of cap retaining fingers 72 projecting from the inner surface of the peripheral wall 56 between that wall and the end walls 62 of the skirt 60. The surface 74 of the finger remote from the end wall is provided with a gripping surface that projects along the finger for an extent slightly greater than the thickness of the web. The web is, of course, provided with slots 76 that will permit the fingers 72 to pass through the web 16 so that the edge of the slot 76 may be engaged by the gripping surface 74 on the finger 72.

The retaining covers 52 are further provided with fastener receiving clearance holes 76 on two diagonally opposite corners while the remaining diagonal corners are provided with recessed bosses 78 for threadably receiving appropriate fasteners. Self tapping screws 80 are inserted through the clearance holes 76, pass through holes 82 in the web 16 and are secured to the screw receiving bosses 78. The retainer cap 52 may further be provided on its outer surface with a transparent lens (not shown) that is secured within the window frame on the face of the cover.

The vial assembly is particularly well suited for automated assembly in an accurate and rapid manner. One cover 52 can be mounted on one side of the frame with the fingers 72 extending through the web 16 and the gripping surfaces 74 engaging the edge of slots 76 thereby holding the cover in place. The vials 22 can then be placed within the notches 26, 28 of the web aperture 20 so that the tongues 50 on the narrow ends 32 thereof rest against the side wall of the web 16 and the wide ends 30 rest in the recesses 66 of the mounted cover. The opposite side cover may then be placed over the vials. The secondary skirts 70 will bear against the vial tongues 50 assuring proper orientation and lateral positioning of the vials while the gripping surfaces 74 of the fingers 72 of the opposite cover will hold the cover in position on a temporary basis until the self tapping fasteners 80 are securely affixed.

As will be apparent to persons skilled in the art, various modifications, adaptations, and variations of the foregoing specific disclosure may be made without departing from the teachings of the present invention.

We claim:

1. In a level comprising a frame provided with parallel working surfaces and a web interconnecting said surfaces, said web having aperture means providing at least one pair of opposed notches, an elongated vial mounted in said notches and having end portions dimensioned relative to said notches so as to acurately fit within said notches for properly positioning the vial relative to at least one of said working surfaces and limiting movement of the vial within the plane of said web and vial retainer cover means overlying the aperture means on at least said one side of the web and having wall portions for holding said vial, the combination wherein one of said vial end portions has a vial retaining tongue projecting beyond said notch for abutting one side of the web for limiting rotational movement and lateral movement of the vial out of said notch in a first lateral direction, said one vial end portion and said tongue being one piece, said cover means including abutment means spaced from said wall portions for engaging said tongue to laterally hold said tongue in retentive abutting engagement with said one side of said web against rotational movement and lateral movement in a direction opposite said first direction.

2. The level of claim 1 wherein the vial is cured along its longitudinal axis.

3. The level of claim 1 wherein the aperture means has two pair of notches and the assembly includes a curved vial mounted in each pair of notches for positioning relative to opposite working surfaces.

4. The level of claim 1 wherein the wall portions include a skirt having a plurality of vial receiving recesses of equal size for limiting lateral displacement of the vial from said notches.

5. The level of claim 1 wherein the cover means includes a pair of reversible vial retaining caps overlying the aperture means on opposite sides of the web, each of said vial retaining caps having vial receiving recesses for limiting lateral displacement of the vial from the notches.

6. The level of claim 1 wherein the vial is gradually tapered from one end portion toward the other and the gradual taper is on the exterior surface of the vial.

7. The level of claim 1 wherein the vial is a plumb and level vial and is gradually tapered from one end portion toward the other and the retaining tongue integrally projects from the narrow end of said vial.

8. The level of claim 1 wherein the vial is gradually tapered from one end portion toward the other and is curved along its longitudinal axis.

9. A level comprising a frame provided with parallel working surfaces and a web interconnecting said surfaces, said web having aperture means providing at least one pair of opposed notches, an elongated vial having a gradually tapered exterior surfaced with one end narrower than the opposite end mounted in said notches and said ends of said vial being dimensioned relative to each other so that the ends of the vial accurately fit within the notches for properly positioning the vial within the plane of the web relative to the working surfaces, said narrower vial end having a vial retaining tongue abutting one side of the web for limiting rotational movement and lateral movement of the vial out of said notch in a first lateral direction, said narrow vial end and said tongue being one piece, and vial retainer cover means overlying the aperture means on at least said one side of the web, said cover means including abutment means engaging said tongue to laterally hold said tongue in retentive abutting engagement with said one side of said web against rotational movement and lateral movement in a direction opposite said first direction.

10. The level of claim 9 wherein the cover means includes a skirt having a plurality of vial receiving recesses of equal size for limiting lateral displacement of the vial from said notches.

11. The level of claim 9 wherein the aperture means has two pair of notches and the assembly includes a curved vial mounted in each pair of notches for positioning relative to opposite working surfaces.

12. A level vial for mounting on the web of a level body comprising an elongated tube having first and second ends of different cross sectional size and a body portion that tapers from the first end toward the second end, said first end being closed by a cap, said second end having an end wall and a tongue extending beyond said end wall, said second end and said tongue being one piece, said tongue being spaced from a plane extending through the longitudinal center line of the vial sufficiently to accommodate one half the thickness of the web.

13. The level of claim 12 wherein the tongue is coextensive with the exterior surface of the vial.

14. The level of claim 12 wherein the vial is curved along its longitudinal center line.

15. In a level comprising a frame having parallel working surfaces and a web interconnecting said surfaces and having aperture means therein, an elongated vial mounted in said aperture means and vial retaining cover means overlying the aperture means and having wall portions for limiting lateral displacement of the vial, the improvement wherein said vial has an vial retaining tongue formed as one piece with the vial projecting beyond said aperture means and abutting one side of the web for limiting rotational movement and lateral movement of the vial out of said notch in a first lateral direction, and said cover means includes abutment means in addition to said wall portions for engaging said tongue to laterally hold said tongue in retentive abutting engagement with said one side of said web against rotational movement and lateral movement in a direction opposite said first direction.

16. The level of claim 15 wherein the wall portions include skirt means spaced from said abutment means and having a vial receiving recess for engaging said vial remote from said tongue for limiting lateral displacement of the vial from said aperture means.

17. The level of claim 16 wherein the vial tapers from one end to the other, the vial retaining tongue projects from the narrow end of said vial and the recess in said skirt means engages the broader end of the vial.

18. The level of claim 14 wherein the cover means includes a pair of reversible vial retaining caps overlying the aperture means on opposite sides of the web, each of said vial retaining caps having vial receiving recesses for limiting lateral displacement of the vial.

19. The level of claim 15 wherein the vial is gradually tapered from one end portion toward the other on the exterior surface of the vial.

20. A bubble level comprising a frame provided with parallel working surfaces and a web interconnecting said surfaces, said web having aperture means, an elongated vial having first and second ends of different cross sectional size and a body portion having an exterior surface that tapers gradually and continuously from the first end toward the second end wherein the bubble travels between said first and second ends during use and vial retaining cover means overlying the aperture means, said cover means including a skirt having a plurality of vial receiving recesses for engaging said vial and limiting displacement of the vial relative to said working surfaces.

21. A level vial for a bubble level comprising an elongated tube having first and second ends of different cross sectional size and a body portion having an exterior surface that tapers gradually and continuously from the first end toward the second end, said first end being closed by a cap and said second end having an integral end wall, wherein the bubble travels between said first and second ends during use.

* * * * *

UNITED STATES PATENT AND TRADEMARK OFFICE
CERTIFICATE OF CORRECTION

PATENT NO. : 5,033,199
DATED : July 23, 1991
INVENTOR(S) : Wilcox et al It is certified that error appears in the above-identified patent and that said Letters Patent is hereby corrected as shown below:

Claim 2, column 5, line 67:     "cured" should be curved

Claim 9, column 6, line 29:   "surfaced" should be surface

Claim 18, line 1: claim "14" should be claim 15

Signed and Sealed this

Sixteenth Day of March, 1993

Attest:

STEPHEN G. KUNIN

Attesting Officer     Acting Commissioner of Patents and Trademarks